United States Patent [19]

Cochran

[11] 4,272,233
[45] Jun. 9, 1981

[54] MOLD FOR PRODUCING EXTRA THIN WALLED PLASTIC CONTAINERS

[75] Inventor: Donald D. Cochran, Bartlett, Ill.

[73] Assignee: National Can Corporation, Chicago, Ill.

[21] Appl. No.: 51,436

[22] Filed: Jun. 25, 1979

[51] Int. Cl.³ .............................................. B29C 17/07
[52] U.S. Cl. ................................... 425/526; 264/520; 264/536; 425/522; 425/806
[58] Field of Search .............. 264/520, 527, 531, 532, 264/534, 540, 541, 542, 543, 527, 536, 523; 425/522, 525, 527, 531, 806 R, 806 A, 526

[56] References Cited

U.S. PATENT DOCUMENTS

| | | | |
|---|---|---|---|
| 3,499,071 | 3/1970 | Hurst | 264/536 |
| 3,687,593 | 8/1972 | Gilbert | 425/531 |
| 3,692,453 | 9/1972 | Quigg | 425/531 |
| 3,758,654 | 9/1973 | Martino | 264/536 |

*Primary Examiner*—Jan H. Silbaugh
*Attorney, Agent, or Firm*—Robert A. Stenzel; James W. Ove

[57] ABSTRACT

In the manufacture of extra thin walled plastic containers the tail flash formed during the molding operation is spaced from the container proper by molding one or more standoff projections into the flash. This maintains the tail flash in an appropriate relationship relative to the container until it can be severed by a shearing mechanism. The projections are formed in the tail flash by providing male and female projection elements in the mold. In the absence of such standoffs, the tail flash will come in contact with the container while still sufficiently hot enough to adhere thereto.

6 Claims, 8 Drawing Figures

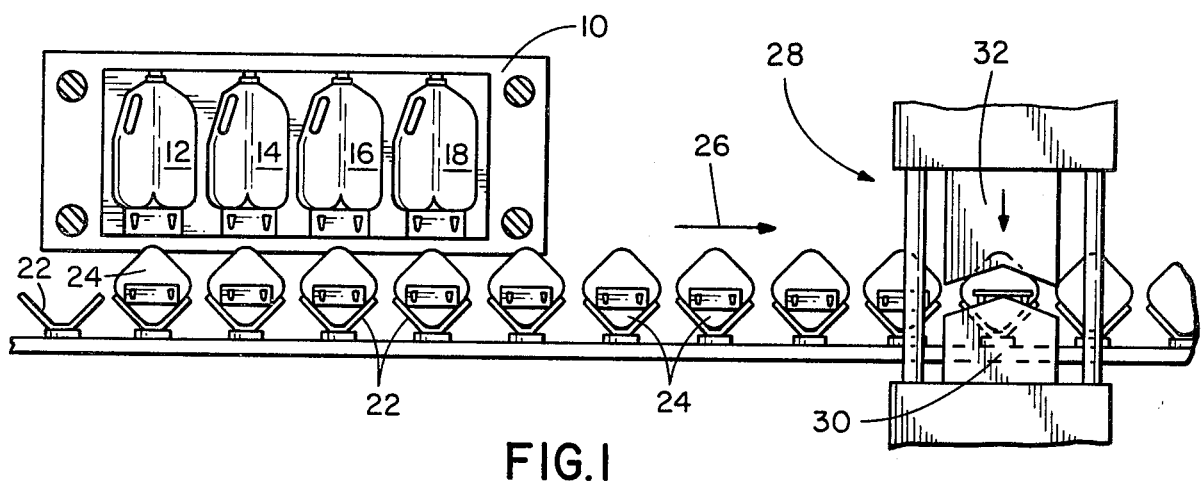
FIG.1
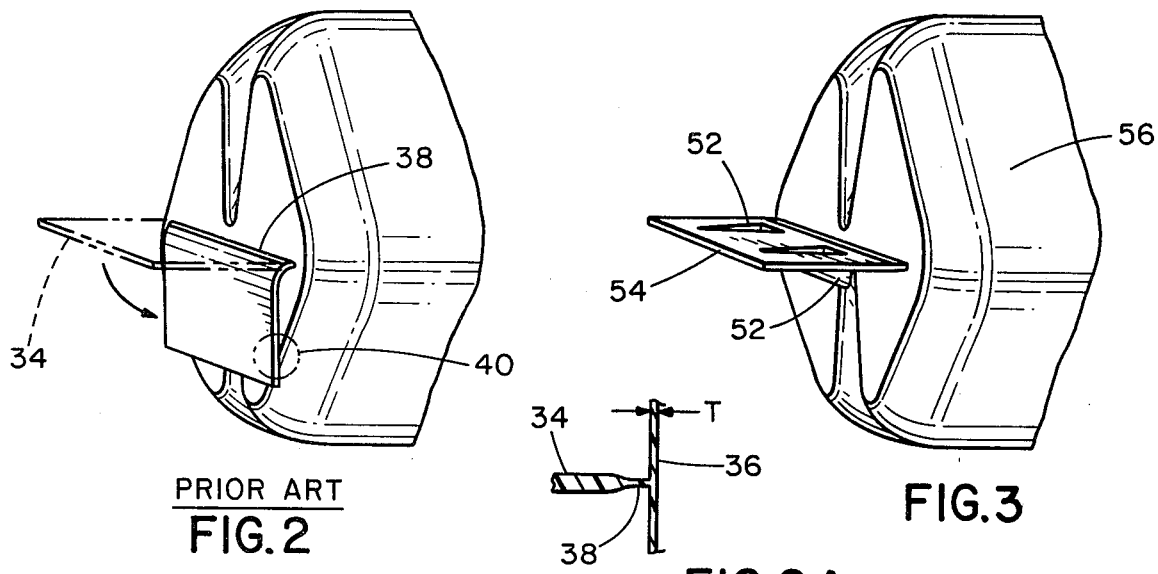
PRIOR ART
FIG.2
FIG.2A
FIG.3
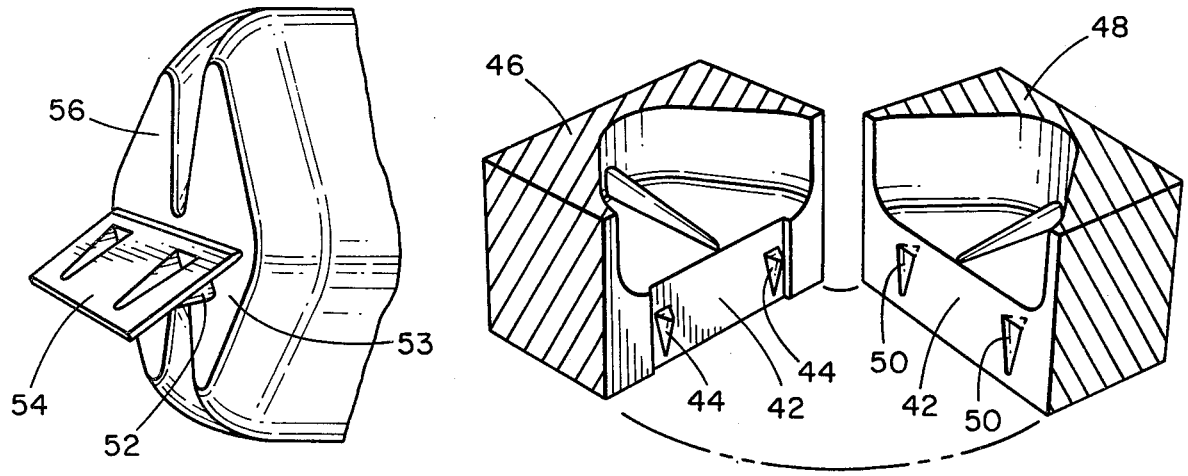
FIG.4
FIG.5

MOLD FOR PRODUCING EXTRA THIN WALLED PLASTIC CONTAINERS

BACKGROUND OF THE INVENTION

This invention relates to the field of plastic containers. More specifically, it relates to the field of thin walled plastic containers used for liquids, such as water, milk, juice, detergents and the like. Frequently, such containers are formed by blow molding machinery. Such machinery introduces a tube of hot plastic between the faces of a mold. The mold faces are then closed and air is blown into the tube of plastic forcing it against the walls of the mold. Water cooling provided in the interior of the mold hardens the plastic in the shape of a container.

When the walls of the mold come together, some of the plastic is positioned beneath the mold area. This remains attached to the molded container by virtue of a narrow connective portion pinched between the walls of the mold. This excess material or tail flash is usually trimmed or severed from the container upon completion of the molding process.

Because the flash is not subjected to the same degree of cooling because of its mass, it remains hot after the container is freed from the mold. For the purpose of removing the flash the containers are positioned on their side and sent to an appropriate device for severing the flash. In standard containers of the type presently available the amount of plastic used to form each container is sufficient to insure that the tail flash is stiff enough that it does not flop over and touch the container when the containers are on their side. This is important because the flash is in a near molten state and will bond to the container and prevent the severing equipment from functioning properly.

In order to maintain plastic containers as an effective packaging medium, it is necessary to keep costs as low as possible and, where possible, further reduce costs. Todays plastic materials are sufficiently strong and ductile to be molded with very thin wall thicknesses. Thus, the materials presently available are capable of being formed into containers having wall thicknesses of 0.020 inches or less.

A problem encountered when extra thin walled containers are produced is that the amount of plastic in the tail flash is reduced in proportion to the reduction in wall thickness of the container. As a result, the tail flash is no longer sufficiently rigid to remain spaced away from the container and in the proper position for severing. In fact, it will rapidly flop over as the containers are turned on their side, engage and stick to the container bottom rendering the resulting container useless.

It is accordingly an object of the present invention to provide an improved mold and method whereby extra thin walled containers can be produced without interference from the tail flash sticking to the container bottoms.

It is another object of the invention to provide a mold for making extra thin walled containers having means for producing standoff projections in the tail flash and for cooling the projections so as to prevent sticking of the tail flash to the container prior to severing the flash therefrom.

A further object of the invention is to provide a method for molding extra thin walled containers such that the tail flash is positively maintained spaced from and at a predetermined angular orientation with respect to the bottom of the molded container.

A further object of the invention is to provide a method and apparatus permitting the manufacture of extra thin walled plastic containers having wall thicknesses of 0.020 inches or less.

BRIEF DESCRIPTION OF THE DRAWINGS

FIG. 1 is a composite schematic view illustrating the essential steps in the formation of blow molded plastic containers.

FIG. 2 is an illustration of a portion of a container manufactured according to the prior art.

FIG. 2A is an enlarged view of the container bottom and tail flash showing certain features thereof important to an understanding of the invention.

FIG. 3 is a tail flash formed according to the present invention.

FIG. 4 illustrates the tail flash assembly in its operative position maintained at a specified distance and angular orientation from the container bottom.

FIG. 5 is a perspective view of a portion of a mold suitable for use in the present invention.

DETAILED DESCRIPTION

Figure 6:
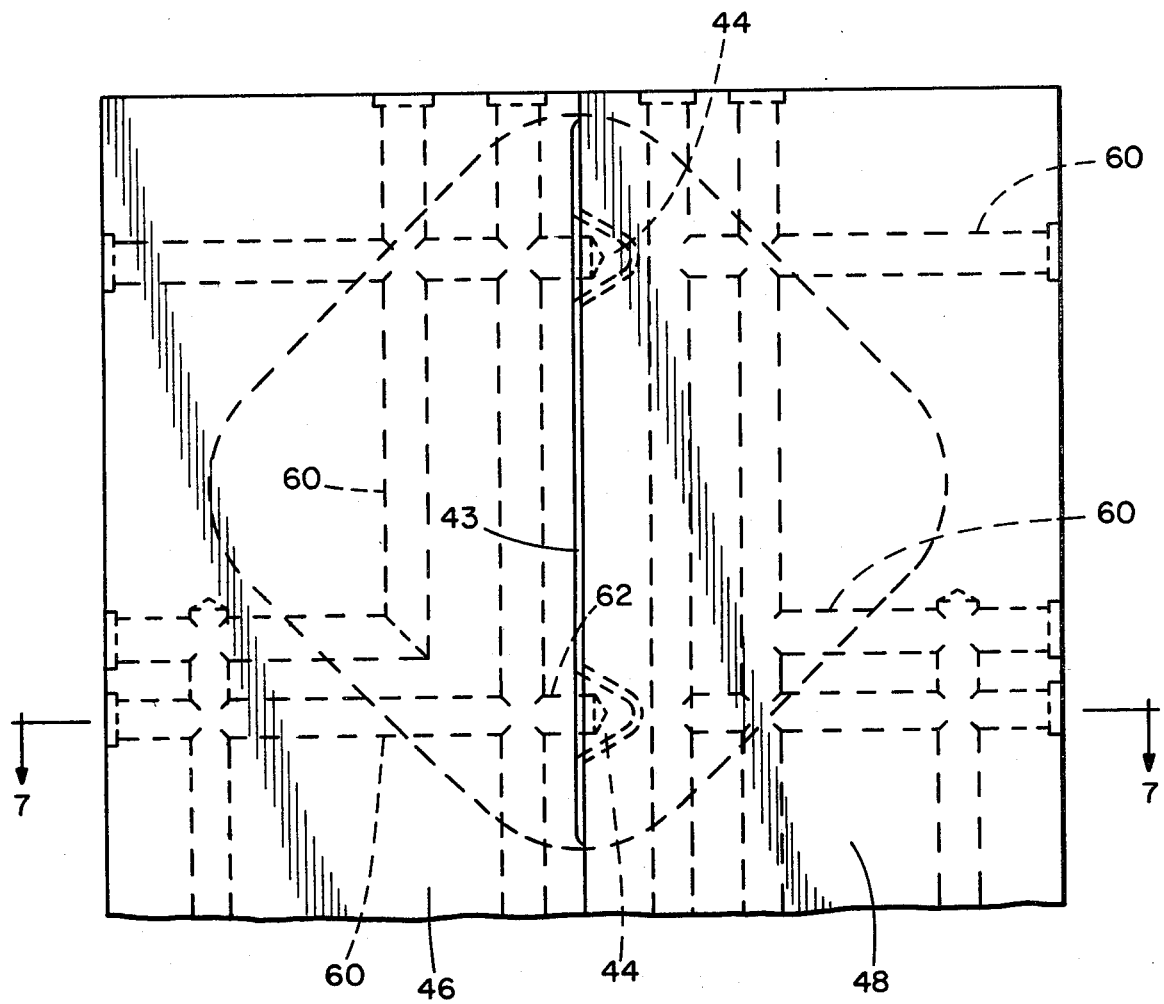
FIG. 6 is a bottom plan view of the mold for use in the present invention indicating the means for cooling the projections.

Referring to FIG. 1, the essential steps and apparatus for forming plastic containers are schematically illustrated. A mold half 10 containing four container cavities 12, 14, 16, and 18 is illustrated. The mold half 10 cooperates with a complimentary half (not shown) to form a complete enclosure, the shape of which determines the configuration of the plastic container produced therein. Molten plastic for forming the container is located between the mold halves prior to the halves closing. Air is then injected into the mold forcing the plastic against the walls of the mold to form the container. The plastic is cooled by water flow through the interior walls of the mold.

After the containers have been molded they are released from the mold halves and travel by means of an appropriate conveyor (not shown) onto a shearing conveyor 20. The conveyor 20 may be of the endless belt type or similar and has a plurality of V-shaped container supports 22. Each container support is configured to receive a plastic container 24 thereon with the container positioned on its side relative to the vertical mold cavities 12, 14, 16 and 18. The shearing conveyor moves the containers, one at a time, in the direction indicated by the arrow 26 towards a shearing mechanism 28.

The shearing mechanism consists of a fixed anvil 30 and a reciprocating pinching member 32. The shearing mechanism is provided for the purpose of removing the tail flash from the bottom of the container. As illustrated in FIG. 2, excess plastic provided in each cavity is extruded out the bottom of the mold and forms a tail flash 34. It is this tail flash which must be cut from the bottom of the container to complete manufacture.

With reference to FIG. 2A, the nature of the tail flash can be more clearly discerned. The tail flash 34 is connected to the bottom of a container 36 by means of a pinch off 38. The pinch off is a narrow, necked down portion of material whose thickness is a function of the amount of plastic utilized in producing the container.

Thus, where relatively thick walled containers are being formed the pinch off 38 will be of a first thickness $t_1$. As the amount of plastic used to form a container is reduced, a thinner walled container will result and, correspondingly, the thickness of the pinch off will be reduced to a value $t_2$ less than $t_1$. FIG. 2 is an example of a prior art container. As the container wall thickness is reduced, the tail flash reaches a point where its weight can no longer be supported by the pinch off 38. Accordingly, it flops from the position indicated in dashed lines to the solid line position where it contacts the container bottom at a plurality of points as indicated, for example, at point 40. This renders the container useless by virtue of preventing of the tail flash from being removed by the severing mechanism.

Referring to FIGS. 1 and 3 to 5, there is illustrated a modification to the mold according to the present invention which results in a tail flash construction which does not suffer from this disadvantage. As best seen in FIG. 5, the bottom portion of the mold halves for each cavity has been modified but, for simplicity of illustration only, a single cavity is shown. The area in which the tail flash is formed is indicated in FIG. 5 at 42. A small spacing, as shown in FIG. 6 at 43, permits the excess plastic to be extruded from the mold cavity into the flash area 42. In the prior art the tail flash emerged from the mold in a molten state attached to the molded container only by the narrow pinch off 38 as illustrated in FIG. 2A.

According to the present invention, the mold is provided with one or more projecting members 44. Thus, the male half of the mold 46 is provided with one or more outwardly projecting members 44 while the female half 48 is provided with complementary recessed portions 50 for receiving the projections 44 therein. The projections 44 are preferably formed with rounded edges to insure easy entry and release of the tail flash from the mold. Their configuration may vary according to the type of container being formed but it is preferred that the projection have a nose-like configuration. The extreme part of the projection contacts the container bottom. Projections may be formed at the time the molds are produced or they may be added to an existing mold using known techniques.

The projections 44 and the complementary receptacles 50 are water cooled in a manner to be described in connection with FIGS. 6 and 7 thus insuring that the portion of the tail flash which is engaged by the projections and receptacles is sufficiently cool and rigid so as to support the tail flash and avoid sticking to the container bottom.

The dimensions of the projection and the number of projections are variable depending upon the size of the container, the amount of tail flash ordinarily resulting from the molding operation and similar variables. As previously indicated, the projections should be noselike or wedged shaped for easier release and they must extend outwardly far enough so that the tail flash is maintained at a position adequate to permit the shearing mechanism 28 to perform properly.

Referring to FIGS. 2 to 4, the effect of molding one or more projections into the tail flash can be seen. By comparing FIGS. 2 and 3, it will be observed that a pair of standoffs or projections 52 have been provided in the tail flash 54 of bottle 56. These projections are arranged so that they extend towards the side of the bottle which is supported on the shearing conveyor 20 of FIG. 1. When the bottles are removed from the mold the tail flashing 54 remains in its semi-molten condition as with the standard molding operation.

Unlike the FIG. 2 embodiment, however, when the pinch off is insufficiently thick to support the tail flash in the extended position illustrated in FIG. 3, it is prevented from flopping over as illustrated in FIG. 2. Instead, as shown in FIG. 4, the standoffs 52 engage the bottom 53 of the container. This spaces the tail flash from the bottom and maintains it at an acute angle with respect to the container bottom sufficient to permit the shearing mechanism 28 to operate. As indicated previously, since the projections 52 are cooled they do not stick to the container bottom.

Figure 7:
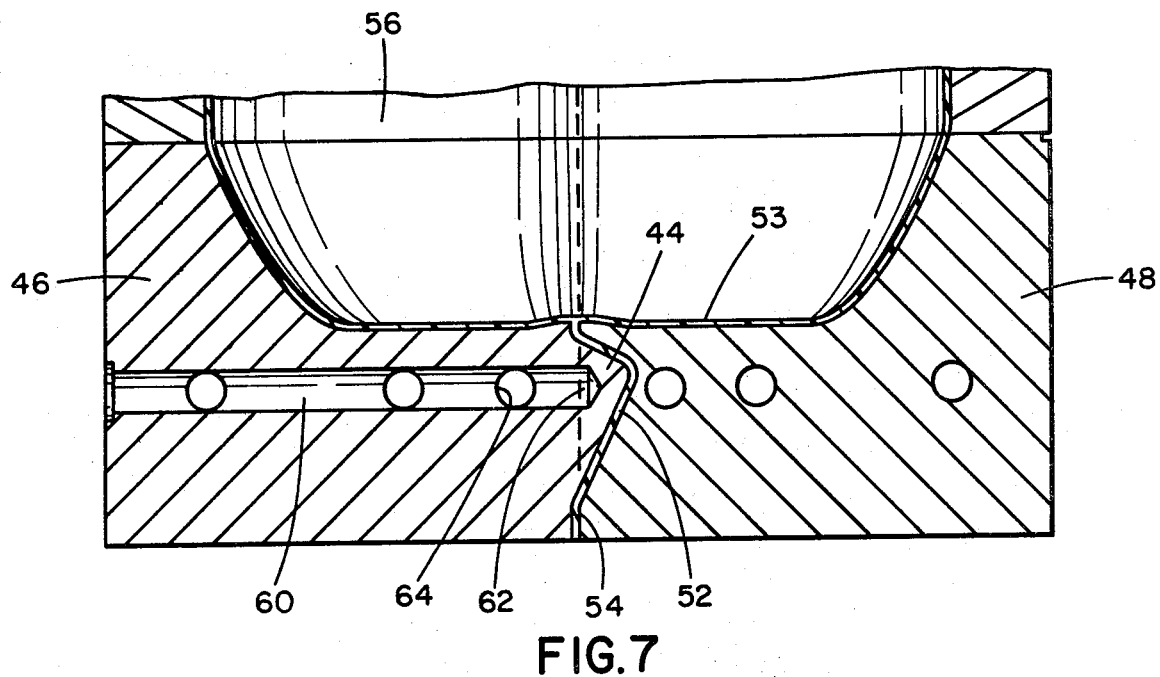
FIG. 7 is a sectional view along the lines 7—7 of FIG. 6.

Referring now to FIGS. 6 and 7, the construction details of the mold are illustrated. The mold is normally provided with a plurality of water channels 60 through which chilled water flows during the molding operation. This assures rapid cooling of the walls of the container when the molten plastic is blown against the mold. According to the present invention, the projections 44 added to the male half 46 of the mold are similarly cooled by boring additional water channels 62 communicating with an existing channel 64. The cold water flowing through channels 60, 62 and 64 adequately cools the projections 44 to insure that they will not stick to the bottom of the container.

As indicated previously, the point at which it is necessary to start using the present invention is a function of the wall thickness of the container. It has been empirically determined that standoffs formed according to the present invention are required whenever the container wall thickness is at or below 0.020 inches for the usual types of plastics used in blow molding, such as H.D.P.E. When gallon size containers are being molded, if the container weight is over 67 grams, the tail flash will generally be strong enough to hold the tail flash in position. At bottle weights of 65 grams or less for the same size container, the wall thickness is approximately 0.020 inches and the tail flash is no longer adequately supported by the pinch off. Thus, the flop over problem is encountered and requires the use of the present invention to prevent rendering the containers unuseable.

While I have shown and described embodiments of this invention in some detail, it will be understood that this description and illustrations are offered merely by way of example, and that the invention is to be limited in scope only by the appended claims.

I claim:

1. A mold assembly for blow molding plastic containers comprising:

a pair of mold halves the respective faces of which when placed in abutting relation form a first cavity, the walls of said cavity defining the configuration of a container to be blow molded therein, said mold halves defining when in said abutting relation an area adjacent said cavity into which plastic is received during container molding to form a flash cavity connected to one surface of said first cavity by an interconnecting constricted pinch-off cavity, one of said mold halves having at least one protrusion in said adjacent area thereof extending outwardly from said face thereof, the other of said mold halves having at least one complementary aligned recess adapted to receive said protrusion, each protrusion and its aligned recess cooperating to define a cavity for a projection in said flash during a container molding, means for cooling said mold halves, and each protrusion and its aligned recess being at a location in said flash cavity which is spaced from said pinch-off cavity.

2. The mold according to claim 1 wherein said one of said mold halves is provided with two of said protrusions and said other of said mold halves is provided with two of said mating recesses, the respective said protrusions and said mating recesses being in spaced relationship across said flash.

3. The mold according to claim 1 wherein each of said projection cavities are wedge shaped in elevation, thereby to aid in rigidifying said flash.

4. The mold according to claim 1 wherein said cooling means includes channels in said one half of said mold through which water is circulateable to cool each said projection cavity.

5. The mold assembly of claim 1 wherein said cooling means is such that each projection molded in a said cavity during container molding is cooled to a heat softened state prior to release of a molded container from said mold assembly, each said projection being adapted for engagement with its associated container to space its associated flash from its associated container after said release.

6. The mold assembly of claim 1 wherein said means for cooling includes projection cavity cooling means for cooling each said projection cavity during container molding, said projection cavity being coolable to an extent sufficient to cool a projection molded in said cavity prior to release of the associated molded container from said mold assembly.

* * * * *